Patented Mar. 27, 1934

1,952,846

UNITED STATES PATENT OFFICE 1,952,846

MANUFACTURE OF ALIPHATIC KETONES

Henry Dreyfus, London, England

No Drawing. Application November 18, 1930, Serial No. 496,571. In Great Britain December 18, 1929

6 Claims. (Cl. 260—134)

This invention relates to the production of aliphatic ketones from aliphatic primary alcohols, and especially to the production of acetone from ethyl alcohol.

According to the invention I have found that acetone can readily be prepared by causing ethyl alcohol to react at relatively high temperatures with barium hydroxide to produce barium acetate, and by thermally decomposing the barium acetate so produced either continuously with its production or as a separate heating operation into acetone.

I have further found that homologous alcohols react in a similar manner to ethyl alcohol, producing the barium salts of the homologous fatty acids which can likewise be thermally decomposed, either continuously with their production or as a separate heating operation, to produce the homologous ketones.

Thus, for instance, diethyl ketone can readily be prepared by causing propyl alcohol to react with barium hydroxide and by thermally decomposing the barium propionate so formed continuously with its production or as a separate heating operation.

The alcohol can be caused to react with the barium hydroxide at temperatures from between about 200 and 500° C., temperatures between about 300 and 500° C. being especially useful in cases where the barium salt of the fatty acid is to be decomposed continuously with its production, whilst temperatures of between about 250 and 350° C. are especially advantageous in cases where it is desired to decompose the barium salt of the fatty acid in a separate heating operation.

In performing the invention I preferably perform the thermal decomposition of the barium salt of the fatty acid continuously with its production. Thus, for instance, I may pass ethyl alcohol vapour or vapour of other primary aliphatic alcohols in a continuous stream over barium hydroxide heated to a temperature between about 300 and 500° C., and preferably between 400 and 500° C. The ketone so produced may be separated from the reaction vapours in any convenient way, as for instance by subjecting the reaction vapours to condensation. If it is desired or necessary to free the reaction product from unconverted alcohol the condensed reaction product may be subjected to fractional distillation.

In cases where it is desired to perform decomposition of the barium salt of the fatty acid as an operation separate from its production, the alcohol vapour may be passed in contact with a barium hydroxide in any convenient way. For instance alcohol vapour may be passed in a stream over barium hydroxide at a temperature of between about 250 and 350° C., whereafter the passage of the alcohol vapour may be stopped and the barium salt of the fatty acid produced may be decomposed into the ketone by heating in the same or in a different reaction vessel, at a temperature between about 400 and 500° C.

If desired the process of the invention may be performed by passing the alcohol vapour over barium hydroxide at a rather low temperature (e. g. 250–350° C.) in order to convert the barium hydroxide partially or entirely into barium acetate (or other fatty acid salt of barium), whereafter the temperature may be raised (e. g. to a temperature between about 350 and 500° C.) to decompose the barium acetate (or other fatty acid salt of barium) into the ketone, and if desired the passage of the alcohol vapour may be continued during the heating to such higher temperature, whereby the alcohol vapour so passed can be converted continuously to the ketone.

The reaction vessel for use in the invention can, of course, be composed of any material capable of resisting corrosion by the barium hydroxide and of resisting the temperatures employed, e. g. copper, stainless steels (e. g. staybrite) or fused silica may be mentioned as constructional materials which are very suitable.

The following example serves to illustrate a convenient form of execution of the invention, but it is to be understood that the invention is in no way limited thereto.

Example

Ethyl alcohol vapour is passed in a continuous stream through a reaction tube or vessel (e. g. of copper) filled or provided with barium hydroxide, and maintained at a temperature of between about 410 and 420° C.

The resulting acetone may, if desired be subjected to fractional distillation in order to obtain it in as pure a form as possible.

What I claim and desire to secure by Letters Patent is:—

1. Process for the manufacture of aliphatic ketones, which comprises treating primary aliphatic alcohols in the vapor phase having at least two carbon atoms with barium hydroxide at temperatures between 250° C. and 350° C. to cause the alcohols to react with barium hydroxide to produce the barium salt of the acid corresponding to the alcohol employed, and then thermally decomposing the barium salt between 400° C. and 500° C. to produce the ketone.

2. Process for the manufacture of acetone, which comprises treating ethyl alcohol in the vapor phase with barium hydroxide at temperatures between about 250° C. and 350° C. to cause the alcohol to react with barium hydroxide to produce barium acetate, and then thermally decomposing the barium acetate between 400° C. and 500° C. to produce acetone.

3. Process for the manufacture of aliphatic ketones, which comprises treating primary aliphatic alcohols in the vapor phase having at least two carbon atoms with barium hydroxide at temperatures between about 250° C. and 350° C. to cause the alcohols to react with barium hydroxide to produce the barium salt of the acid corresponding to the alcohol employed, and thermally decomposing the barium salt between 400° C. and 500° C. to produce the ketone continuously with the production of the barium salt.

4. Process for the manufacture of acetone, which comprises treating ethyl alcohol in the vapor phase with barium hydroxide at temperatures between about 250° C. and 350° C. to cause the alcohol to react with barium hydroxide to produce barium acetate and thermally decomposing the barium acetate between 400° C. and 500° C. to produce acetone continuously with the production of the barium acetate.

5. Process for the manufacture of aliphatic ketones, which comprises causing primary aliphatic alcohols having at least two carbon atoms to react at temperatures of between about 250 and 350° C. upon barium hydroxide and thermally decomposing the barium salt so produced at temperatures of between about 400 and 500° C.

6. Process for the manufacture of acetone, which comprises causing ethyl alcohol to react at temperatures of between 250 and 350° C. upon barium hydroxide and thermally decomposing the barium acetate so produced at temperatures of between about 400 to 500° C.

HENRY DREYFUS.